United States Patent [19]

Micic et al.

[11] Patent Number: 4,653,055
[45] Date of Patent: Mar. 24, 1987

[54] METHOD OF CORRECTING ERRORS IN BYTES OF TELETEXT SIGNALS

[75] Inventors: Liubomir Micic, Freiburg; Thomas Fischer, Umkirch; Ulrich Langenkamp, Freiburg, all of Fed. Rep. of Germany

[73] Assignee: ITT Industries, Inc., New York, N.Y.

[21] Appl. No.: 682,510

[22] Filed: Dec. 17, 1984

[30] Foreign Application Priority Data

Dec. 19, 1983 [EP] European Pat. Off. ........ 83112760.0

[51] Int. Cl.$^4$ .............................................. G06F 11/08
[52] U.S. Cl. ........................................ 371/69; 371/49; 371/51
[58] Field of Search .............................. 371/69, 49, 51

[56] References Cited

U.S. PATENT DOCUMENTS

| | | | |
|---|---|---|---|
| 3,531,769 | 9/1970 | Montgomery et al. | 371/69 X |
| 3,732,541 | 5/1973 | Neubauer | 371/69 |
| 3,737,577 | 6/1973 | Birkin | 371/69 X |
| 3,906,445 | 9/1975 | Beckmann et al. | 371/69 |
| 3,973,242 | 8/1976 | Field et al. | 371/69 |
| 4,577,332 | 3/1986 | Brenig | 371/69 X |

Primary Examiner—Charles E. Atkinson
Attorney, Agent, or Firm—Donald J. Lenkszus

[57] ABSTRACT

With this correcting method, errors in bytes are corrected successively. To this end, the signal resulting from the parity check is stored into a page memory, along with the character bits of each byte. The parity check signal replaces the parity bit of each byte. Two successively received identical pages are stored together with their parity check bits into first and second segments of the page memory. The two pages are compared for equality of the character bits and parity check bits. The result of the comparison is evaluated as follows. In case of equality and correct parity, the byte stored in the first segment will remain unchanged; in case of inequality of the two bytes and correct parity of one of the two bytes, the byte having correct parity will be stored into or remain stored in the first segment; in case of inequality and incorrect parity of the two bytes, no change will be made in the first segment; in case inequality and correct parity of the two bytes, the byte in the first segment will be replaced by a blank byte. The next received identical page but one is stored into the second segment by overwriting, and the correction is repeated with this byte. By this method, single errors are detected and corrected and double errors are detected and replaced by a blank character. In a preferred embodiment with a third segment of the page memory, storage of the third received identical page, and corresponding comparisons of the bytes in the three segments, the method is extended so that double errors are corrected as well.

8 Claims, 1 Drawing Figure

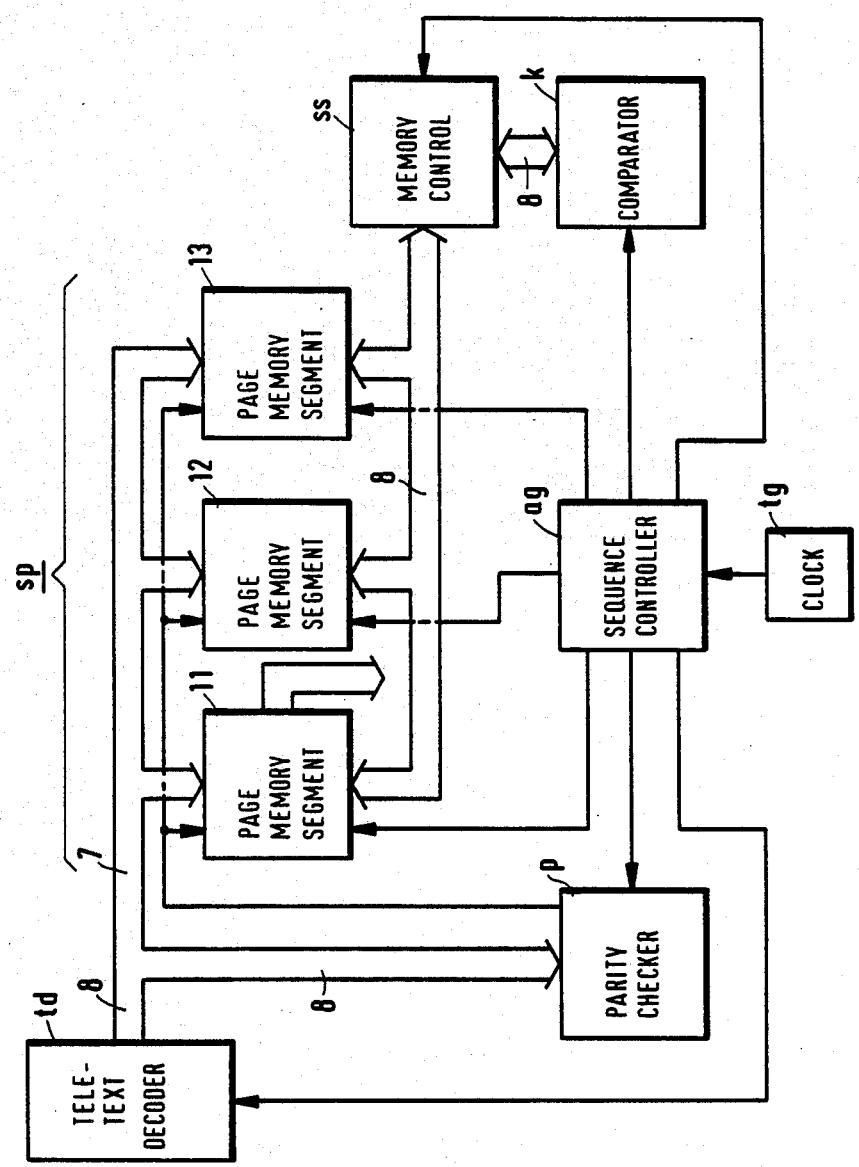

METHOD OF CORRECTING ERRORS IN BYTES OF TELETEXT SIGNALS

BACKGROUND OF THE INVENTION

The present invention pertains to an arrangement and method for correcting errors in teletext signals.

More specifically, the present invention relates to a method of correcting errors in the individual bytes of teletext signals which are received successively and periodically page by page. After the teletext signals are decoded, they are stored page by page into first segments of a page memory of a television receiver. Each segment is designed to hold one page. A teletext page to be displayed on the television screen is selected from the page memory in response to a page selection signal. Erroneous characters are detected by parity checks of the bytes and indicated as blank characters which are replaced by correct characters contained in the same page at the next instant reception.

Such a correcting method is described in the journal "Funkschau", 1977, pages 820 to 824 and 882 to 887, especially page 885, right column at the top. As shown in FIG. 18 on page 885, it can be seen that the bytes are fed to the page memory without the parity bit but are fed to the parity checker with the parity bit. The output signal of the parity checker is applied through an AND gate to the write enable input of the page memory, i.e., only if a correct parity is detected will the bytes be stored into the page memory. In case of incorrect parity, the respective location will remain disabled, so that a blank character will appear on the television screen.

By means of the parity check, only a single error in each byte can be detected, while double errors go unnoticed.

SUMMARY OF THE INVENTION

One object of the invention is to provide a correcting method of the above kind which also allows at least double errors to be detected and, in a preferred embodiment, to be corrected.

A principal advantage of the invention thus follows directly from the way in which the object is attained, since the known correcting method is improved considerably.

With this correcting method, errors in bytes are corrected successively. To this end, the signal resulting from the parity check is stored into a page memory, along with the character bits of each byte. The parity check signal replaces the parity bit of each byte. Two successively received identical pages are stored together with their parity check bits into first and second segments of the page memory. The two pages are compared for equality of the character bits and parity check bits. The result of the comparison is evaluated as follows. In case of equality and correct parity, the byte stored in the first segment will remain unchanged; in case of inequality of the two bytes and correct parity of one of the two bytes, the byte having correct parity will be stored into or remain stored in the first segment; in case of inequality and incorrect parity of the two bytes, no change will be made in the first segment; in case inequality and correct parity of the two bytes, the byte in the first segment will be replaced by a blank byte. The next received identical page but one is stored into the second segment by overwriting, and the correction is repeated with this byte. By this method, single errors are detected and corrected and double errors are detected and replaced by a blank character. In a preferred embodiment with a third segment of the page memory, storage of the third received identical page, and corresponding comparisons of the bytes in the three segments, the method is extended so that double errors are corrected as well.

BRIEF DESCRIPTION OF THE DRAWINGS

The invention will now be described in more detail with reference to the single FIGURE of the accompanying drawing, which is a highly schematic block diagram of an embodiment of an arrangement for carrying out the correcting method.

DETAILED DESCRIPTION

The FIGURE shows the teletext decoder td, which can be thought of as uniting all those stages of FIG. 18 on page 885 of the above-mentioned journal which process the teletext signals so that they can be written into the page memory sp. The output of the teletext decoder td is, therefore, connected to the data inputs of the individual segments 11, 12, 13 of the page memory sp, such that only the first seven bits (reference numeral 7), i.e., not the parity bit, are connected to the data inputs. On the other hand, the output of the teletext decoder td, including the parity bit (reference numeral 8), is connected to the input of the parity checker p, whose output line carrying the signal resulting from the parity check is connected as the eighth data input line to the data inputs of the segments 11, 12, 13 of the page memory sp.

The first segment 11 of the page memory sp holds a given received page which contains detected erroneous characters. In the second segment 12 of the page memory sp, the next received page which is identical with the page stored in the first segment is stored; here, too, the signal resulting from the parity check is stored as the parity bit of the respective byte.

The two segments 11, 12 are connected by an eight-wire data bus to the memory control ss, which, in turn, exchanges data with the comparator k. Thus, corresponding bytes of the two identical pages stored in the segments 11, 12 are checked for equality of the character bits by means of the comparator k and evaluated according to the two parity bits as follows. In case of equality and correct parity of the two bytes, the byte stored in the first segment 11 will remain unchanged. In case of inequality of the two bytes and correct parity of one of the two bytes, the byte having correct parity will be stored into the first segment 11 if no byte with correct parity is present there yet, or the byte with correct parity stored in the first segment 11 will remain stored there. In case of inequality and incorrect parity of the two bytes, no change will be made in the first segment 11, while in case of inequality and correct parity of the two bytes, the byte in the first segment 11 will be replaced by a blank byte.

This correction process continuous without interruption since the next received page but one which is identical with the page stored in the first segment 11 is stored by overwriting the bytes previously stored in the second segment 12. Thus, the character errors resulting in the display of a blank character are continuously reduced by the continuous correction process.

Besides the subcircuits mentioned above, the accompanying drawing shows the sequence controller ag, which, controlled by the output pulses of the clock generator tg, supplies all other subcircuits with correct timing signals. In the teletext standard as described in the above-mentioned journal, the frequency of the clock generator tg is 6.9375 MHz.

The third segment 13 of the page memory sp and its control make it possible to develop and improve the error correction and, thus, the correcting method of the invention. In the third segment 13, the next received page but one which is identical with the page stored in the first segment 11 is stored in the same manner as the page stored in the first segment 11. Corresponding bytes of the three like pages are checked for equality of the character bits and evaluated in accordance with the three parity bits as follows. In case of equality and correct parity of the first two bytes, the byte stored in the first segment 11 will remain unchanged. In case of inequality of the first two bytes and correct parity of one of these two bytes, the byte having correct parity will be stored into the first segment 11 or, if the byte with correct parity is already present there, remain unchanged. In case of inequality and incorrect parity of the first two bytes but correct parity of the third byte, the latter will be stored into the first segment 11. In case of inequality and correct parity of the first two bytes and equality to the third byte, the latter will be stored into the first segment 11. The two following received identical pages are stored into the second and third segments 12 and 13, respectively, by overwriting the bytes previously stored there, and the correction process is repeated with these bytes.

By the extended correcting method using the third segment 13, not only single bit errors in each byte but also double errors are detected and corrected.

The correcting method according to the invention becomes especially efficient if, in the case of a continuous text extending over several pages, subsequent pages already transmitted during the display of, e.g., page 1 which are very likely to be displayed, too, are constructed in free segments of the page memory and corrected in accordance with the invention. When called up for display on the screen, such following pages are then immediately error-free even under disturbed receiving conditions.

What is claimed is:

1. A method of correcting errors in individual bytes of teletext signals comprising the steps of:
    receiving individual bytes of teletext signals successively and periodically in page by page fashion, each of said individual bytes including a parity bit and character bits;
    decoding said bytes;
    checking parity on each of said bytes to generate a parity check signal for each of said bytes;
    storing said decoded bytes in one segment of a multisegment page memory, said parity check signal for each corresponding one of said bytes being stored with said corresponding one of said bytes in place of the parity bit for each said corresponding one of said bytes;
    comparing corresponding bytes of a first page stored in first segment of said segments with corresponding bytes of a second page stored in a second segment of said segments to check for equality of the character bits in said corresponding bytes and to evaluate said parity check signals such that:
    a. when a byte of said first page and the corresponding byte of said second page exhibit equality of the respective character bits and correct parity the byte stored in said first segment remains unchanged,
    b. when a byte of said first page and the corresponding byte of said second page exhibit inequality and when only one of said byte and said corresponding byte exhibits correct parity, the byte having correct parity is stored into or remains stored in said first segment
    c. when there is inequality between the character bits of a byte of said first page and the corresponding byte of said second page and both bytes exhibit incorrect parity, no change is made in the byte of said first segment, and
    d. when there is inequality between the character bits of a byte of said first page and the corresponding byte of said second page and both bytes exhibit correct parity the byte in said first segment is replaced by a byte having character bits for a blank character.

2. A method in accordance with claim 1 comprising the further step of storing decoded bytes of each page identical to said first page and subsequent to said second page in said second segment.

3. A method of correcting errors in individual bytes of teletext signals comprising the steps of:
    receiving individual bytes of teletext signals successively and periodically in page by page fashion, each of said individual bytes including a parity bit and character bits;
    decoding said bytes;
    checking parity on each of said bytes to generate a parity check signal for each of said bytes;
    storing said decoded bytes in one segment of a multisegment page memory, said parity check signal for each corresponding one of said bytes being stored with said corresponding one of said bytes in place of the parity bit for each said corresponding one of said bytes;
    comparing corresponding bytes of a first page stored in a first segment of said segments with corresponding bytes of a second page stored in a second segment of said segments and with corresponding bytes of a third page stored in a third segment of said segments to check for equality of the character bits in said corresponding bytes and to evaluate said parity check signals such that:
    a. when a byte of said first page and the corresponding byte of said second and third pages exhibit equality of the respective character bits and correct parity for the bytes of said first and second page the byte stored in said first segment remains unchanged,
    b. when a byte of said first page and the corresponding byte of said second page exhibit inequality and when only one of said byte and said corresponding byte of said second page exhibits correct parity, the byte having correct parity is stored into or remains stored in said first segment
    c. when there is inequality between the character bits of a byte of said first page and the corresponding byte of said second page and both bytes exhibit incorrect parity and the corresponding byte of said third page exhibits correct parity then the byte of said third pages is stored into said first segment in place of the byte previously stored therein, and
    d. when there is inequality between the character bits of a byte of said first page and the corresponding byte of said second page and both bytes exhibit correct parity and there is equality between the corresponding bytes of said third page and the byte of one of said further second pages, then the byte in said first segment is replaced by said corresponding byte of said third page.

4. A method in accordance with claim 3 comprising the further step of storing decoded bytes of two pages identical to said first page and subsequent to said third page in said second and third segments, respectively 5. Apparatus of correcting errors in individual bytes of teletext signals comprising:
   means for receiving individual bytes of teletext signals successively and periodically in page by page fashion, each of said individual bytes including a parity bit and character bits;
   means for decoding said bytes;
   means for checking parity on each of said bytes to generate a parity check signal for each of said bytes;
   means for storing said decoded bytes in one segment of a multisegment page memory, said parity check signal for each corresponding one of said bytes being stored with said corresponding one of said bytes in place of the parity bit for each said corresponding one of said bytes;
   means for comparing corresponding bytes of a first page stored in first segment of said segments with corresponding bytes of a second page stored in a second segment of said segments to check for equality of the character bits in said corresponding bytes and to evaluate said parity check signals such that:
   a. when a byte of said first page and the corresponding byte of said second page exhibit equality of the respective character bits and correct parity the byte stored in said first segment remains unchanged,
   b. when a byte of said first page and the corresponding byte of said second page exhibit inequality and when only one of said byte and said corresponding byte exhibits correct parity, the byte having correct parity is stored into or remains stored in said first segment
   c. when there is inequality between the character bits of a byte of said first page and the corresponding byte of said second page and both bytes exhibit incorrect parity, no change is made in the byte of said first segment, and
   d. when there is inequality between the character bits of a byte of said first page and the corresponding byte of said second page and both bytes exhibit correct parity the byte in said first segment is replaced by a byte having character bits for a blank character.

6. Apparatus in accordance with claim 5 wherein said storing means stores decoded bytes of each page identical to said first page and subsequent to said second page in said second segment.

7. Apparatus for correcting errors in individual bytes of teletext signals comprising:
   means for receiving individual bytes of teletext signals successively and periodically in page by page fashion, each of said individual bytes including a parity bit and character bits;
   means for decoding said bytes;
   checking parity on each of said bytes to generate a parity check signal for each of said bytes;
   means for storing said decoded bytes in one segment of a multisegment page memory, said parity check signal for each corresponding one of said bytes being stored with said corresponding one of said bytes in place of the parity bit for each said corresponding one of said bytes;
   means for comparing corresponding bytes of a first page stored in a first segment of said segments with corresponding bytes of a second page stored in a second segment of said segments and with corresponding bytes of a third page stored in a third segment of said segments to check for equality of the character bits in said corresponding bytes and to evaluate said parity check signals such that:
   a. when a byte of said first page and the corresponding byte of said second and third pages exhibit equality of the respective character bits and correct parity for the bytes of said first and second page the byte stored in said first segment remains unchanged,
   b. when a byte of said first page and the corresponding byte of said second page exhibit inequality and when only one of said byte and said corresponding byte of said second page exhibits correct parity, the byte having correct parity is stored into or remains stored in said first segment
   c. when there is inequality between the character bits of a byte of said first page and the corresponding byte of said second page and both bytes exhibit incorrect parity and the corresponding byte of said third page exhibits correct parity then the byte of said third pages is stored into said first segment in place of the byte previously stored therein, and
   d. when there is inequality between the character bits of a byte of said first page and the corresponding byte of said second page and both bytes exhibit correct parity and there is equality between the corresponding bytes of said third page and the byte of one of said further second pages, then the byte in said first segment is replaced by said corresponding byte of said third page.

8. Apparatus in accordance with claim 7 wherein said storing means stores decoded bytes of two pages identical to said first page and subsequent to said third page in said second and third segments, respectively.

* * * * *